United States Patent
Lee et al.

(10) Patent No.: US 8,687,142 B2
(45) Date of Patent: Apr. 1, 2014

(54) BACKLIGHT UNIT COMPRISING A BOTTOM COVER INCLUDING AN EMBOSSING PORTION THAT OVERLAPS WITH A PORTION OF AN LED PACKAGE AND LIQUID CRYSTAL DISPLAY USING THE SAME

(75) Inventors: Joohong Lee, Seoul (KR); Seokhwan Oh, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 180 days.

(21) Appl. No.: 12/848,776

(22) Filed: Aug. 2, 2010

(65) Prior Publication Data

US 2011/0025944 A1 Feb. 3, 2011

(30) Foreign Application Priority Data

Aug. 3, 2009 (KR) .................. 10-2009-0071188

(51) Int. Cl.
*G02F 1/1335* (2006.01)
*G09F 13/04* (2006.01)
*F21V 7/04* (2006.01)

(52) U.S. Cl.
USPC .............................. 349/61; 362/97.3; 362/612

(58) Field of Classification Search
USPC .................. 349/61, 65; 362/97.1–97.4, 612
See application file for complete search history.

(56) References Cited

U.S. PATENT DOCUMENTS

2005/0253158 A1* 11/2005 Yasukawa et al. .............. 257/98

FOREIGN PATENT DOCUMENTS

| CN | 1811558 A | 8/2006 | |
|---|---|---|---|
| CN | 1893129 A | 1/2007 | |
| CN | 2916930 Y | 6/2007 | |
| CN | 101187463 A | 5/2008 | |
| JP | 2002-162626 A | 6/2002 | |
| JP | 2002162626 A | * 6/2002 | ............ G02F 1/3357 |
| KR | 10-2008-0076258 A | 8/2008 | |

* cited by examiner

*Primary Examiner* — Paul Lee
(74) *Attorney, Agent, or Firm* — McKenna, Long & Aldridge, LLP

(57) ABSTRACT

A backlight unit comprises a light emitting diode (LED) package including one or more LED chips, a light source PCB mounting one side of a bottom of the LED package or both sides of the bottom of the LED package, a bottom cover supporting the light source PCB under the light source PCB, and having an embossing portion which protrudes toward the LED package with a size corresponding to the bottom of the LED package which is not mounted on the light source PCB, and a heat emission material filling between the bottom of the LED package and the embossing portion.

10 Claims, 3 Drawing Sheets

BACKLIGHT UNIT COMPRISING A BOTTOM COVER INCLUDING AN EMBOSSING PORTION THAT OVERLAPS WITH A PORTION OF AN LED PACKAGE AND LIQUID CRYSTAL DISPLAY USING THE SAME

This application claims the benefit of Korea Patent Application No. 10-2009-0071188 filed on Aug. 3, 2009, which is incorporated herein by reference for all purposes as if fully set forth herein.

BACKGROUND

1. Field of the Invention

This document relates to a backlight unit and a liquid crystal display using the same capable of improving a heat emission characteristic.

2. Discussion of the Related Art

A liquid crystal display ("LCD") has been widely applied due to its lightweight, thin profile, lower power consumption driving, and so on. Such an LCD has been employed as a portable computer such as a notebook PC, an office automation device, an audio/video device, an indoor/outdoor advertisement display device or the like. A transmissive LCD which takes up most of the LCDs displays images by controlling an electric field applied to an LC layer to adjust a light from a backlight unit depending on data voltages.

As a light source of the backlight unit, a light emitting diode (LED), which has the advantages of low power consumption, light weight and high luminance, has been suggested instead of a fluorescent lamp such as a cold cathode fluorescent lamp (CCFL).

The LED has good characteristics, for example, small-sized, clear light-emission, good initial driving, quake-proof, and strong durability in frequent light-on/light-off. In recent years, with the advent of a white LED which emits a white light, application fields of the LED has been widespread from indicators of electronic products, to households, panels for advertisement, or the like. Furthermore, in accordance with a high efficiency of an LED package, the LED is applied to streetlights, head lamps for automobiles, and general illumination light sources replacing fluorescent lamps.

For energy applied to the LED package, about 15% thereof is converted into a light and about 85% thereof is consumed as a heat. The efficiency and lifespan of the LED package are reduced as a heat generated from the PN junction becomes more. Therefore, a high efficiency and high luminance LED package requires a heat emission design for dissipating heats generated from the LED chips.

As shown in FIG. 1, an LED package 1 is soldered on a generally expensive metal PCB (printed circuit board) 2 for heat emission. The metal PCB 2 has a structure in which a resin layer 2B, a copper layer 2C, and a solder resist layer are stacked on an aluminum metal substrate 2A. The resin layer 2B functions to electrically separate the copper layer 2C where currents flow from the underlying metal substrate 2A, and also functions to form a heat transfer path between the copper layer 2C and the underlying metal substrate 2A. A heat generated from the LED package 1 is first transferred to the copper layer 2C, and then to the underlying metal substrate 2A via the resin layer 2B. The heat transferred to the metal substrate 2A is transferred to a bottom cover 4 of the backlight unit via a heat emission pad 3 attached to the backlight unit. The bottom cover 4 takes up a relatively large area, and thereby can sufficiently function as a main heat emission plate.

However, as can be seen from the above heat transfer process, in the related art, the heat transfer path is complicated and particularly the heat transfer efficiency is very low due to the resin layer and the heat emission pad having lower heat conductivity than metal. As a result, there is limitation in improving the heat emission characteristic of the LED package in the related art.

SUMMARY

Embodiments of the present invention provide a backlight unit and a liquid crystal display using the same capable of improving a heat emission characteristic of a light emitting diode (LED) package.

According to an exemplary embodiment of the present invention, there is provided a backlight unit comprising a light emitting diode (LED) package including one or more LED chips, a light source PCB mounting one side of a bottom of the LED package or both sides of the bottom of the LED package, a bottom cover supporting the light source PCB under the light source PCB, and having an embossing portion which protrudes toward the LED package with a size corresponding to the bottom of the LED package which is not mounted on the light source PCB, and a heat emission material filling between the bottom of the LED package and the embossing portion.

A thickness of the embossing portion may be proportional to that of the light source PCB.

When both sides of the bottom of the LED package are mounted on the light source PCB, a hole may be formed in the light source PCB so as to be filled with the heat emission material.

When one side of the bottom of the LED package is mounted on the light source PCB, the other side of the LED package which is not mounted may be supported by the heat emission material.

The heat emission material may be filled by a soldering or a pasting.

The LED package may further comprise a zener diode connected to the LED chip.

Also, according to an exemplary embodiment of the present invention, there is provided liquid crystal display comprising a liquid crystal display panel, and a backlight unit supplying light for the liquid crystal display panel, wherein the backlight unit includes a light emitting diode (LED) package including one or more LED chips, a light source PCB mounting one side of a bottom of the LED package or both sides of the bottom of the LED package, a bottom cover supporting the light source PCB under the light source PCB, and having an embossing portion which protrudes toward the LED package with a size corresponding to the bottom of the LED package which is not mounted on the light source PCB, and a heat emission material filling between the bottom of the LED package and the embossing portion.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Hereinafter, exemplary embodiments of this document will be described with reference to FIGS. 2 to 7.

Figure 1:
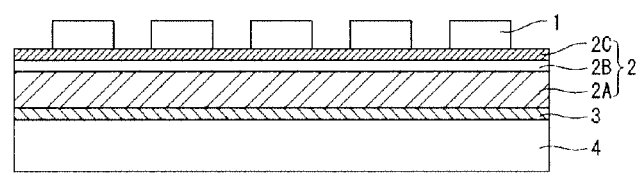
FIG. 1 is a sectional view illustrating a heat transfer path from an LED package to a bottom cover according to the related art.
Figure 2:
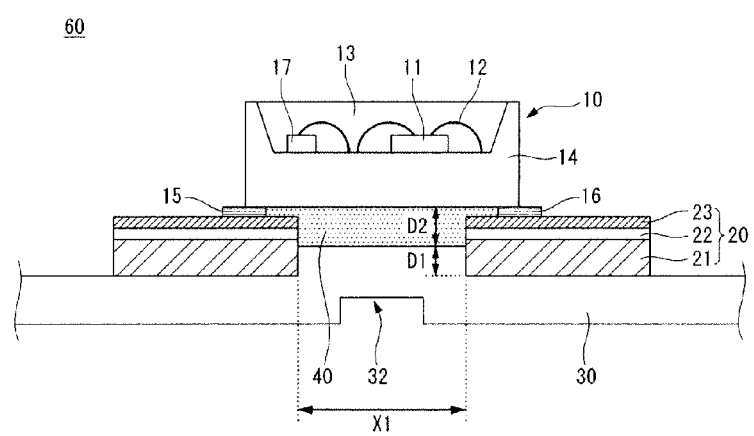
FIGS. 2 and 3 are diagrams illustrating a heat emission structure of a backlight unit according to a first embodiment of this document.
Figure 3:
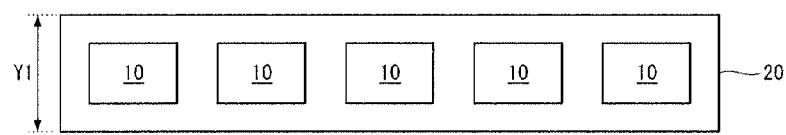

FIGS. 2 and 3 are diagrams illustrating a heat emission structure of a backlight unit according to a first embodiment of this document;

Referring to FIGS. 2 and 3, a backlight unit 60 according to the first embodiment comprises an LED package 10, a light source PCB 20, and a bottom cover 30.

The LED package 10 generates light. The LED package 10 includes a package body 14, one or more LED chips 11 and zener diodes 17, a cathode lead frame 15, and an anode lead frame 16. The LED chip 11 and the zener diode 17 are mounted in a depressed portion of the upper surface of the package body 14. A cathode electrode of the LED chip 11 is connected to the cathode lead frame 15 via a wire 12, and an anode electrode of the LED chip 11 is connected to the anode lead frame 16 via the wire 12. The zener diode 17 is connected to the LED chip 11 via the wire 12, and blocks static electricity from entering the LED chip 11 so as to protect the LED chip 11 from the static electricity.

The cathode lead frame 15 and the anode lead frame 16 are formed as metal patterns separated from each other on a lower surface of the package body 14. The cathode lead frame 15 and the anode lead frame 16 may be patterned with the same metal.

The depressed portion of the upper surface of the LED package is filled with a resin 13. The resin 13 transmits visible light generated from the LED chip 11, and protects the LED chip 11, the zener diode 17, and the wire 12 from moisture and oxygen. The resin 13 may comprise a fluorescent material.

This LED package 10 may be directly mounted on the light source PCB 20 using the surface mount technology (SMT).

The light source PCB 20 has a structure where a resin layer 22, a copper layer 23, and a solder resist layer are stacked on a base substrate 21. The base substrate 21 may be made of FR4 (flame retardant composition 4), or CEM3. In addition, the base substrate 21 may be made of an aluminum-containing metal material. The base substrate 21 may further comprise a metal bar. The resin layer 22 functions to electrically separate the copper layer where currents flow from the underlying base substrate 21, and also functions to form a heat transfer path between the copper layer 23 and the underlying base substrate 21. The resin layer 22 has heat conductivity of about 0.4 to 2.2 W/mk which is considerably low relative to metals. In order to make the heat emission structure efficient, the thickness of the resin layer 22 is required to be reduced. However, since the resin layer 22 functions to reliably bind the base substrate 21 and the copper layer 23, and to reduce a stress in both the layers 21 and 23, it is difficult to reduce the thickness of the resin layer 22 to a degree for smooth heat transfer. Therefore, an embodiment of this document exposes the bottom cover 30 by forming a hole at a part of an area corresponding to the bottom of the LED package 10. Also, a heat emission material 40 fills between the bottom of the LED package 10 and the bottom cover 30 using a soldering or a pasting. Accordingly, the heat transfer path to the bottom cover 30 is made simple, and thus the heat transfer efficiency is much increased.

Circuit patterns for supplying power for the LED package 10 are provided on the light source PCB 20, and a solder resist is coated thereon. Connectors (not shown) may be mounted on the light source PCB 20. The connectors mounted on the light source PCB 20 are connected to connectors of a PCB where LED driving circuits are mounted via an FPC (flexible printed circuit board) or an FFC (flexible flat cable), and supply power from the driving circuits for the LED package 10 via the circuit patterns. The light source PCB 20 may be attached to the bottom cover 30 so that its lower surface faces the bottom cover 30. The light source PCB 20 may be attached to the bottom cover via the known heat emission pad, or may be attached to the bottom cover 30 by various coupling methods such as welding, adhesive, screws, hooks or the like. There is no need of an additional heat sink between the light source PCB 20 and the bottom cover 30.

The bottom cover 30 may be fabricated using aluminum or the alloy thereof. The bottom cover 30 includes an embossing portion 32 which protrudes toward the LED package 10 with the size X1 corresponding to the hole-formed area of the light source PCB 20. The protruding height D of the embossing portion 32 may vary depending on the thickness of the light source PCB 20. As the light source PCB 20 is thickened, the heat emission material 40 filling the hole is increased in amount. Thereby, an amount of the heat emission material 40 filling the hole may be decreased by increasing the protruding height D1. The heat conductivity of the heat emission material 40 is better than that of the resin layer 22, but is lower than metals. Accordingly, when the thick light source PCB 20 is used for prevention bending and for convenience of the SMT process, it may be important to reduce the space D2 which is filled with the heat emission material 40 by using the embossing portion 32. Meanwhile, the bottom cover 30 may be grounded.

Figure 4:
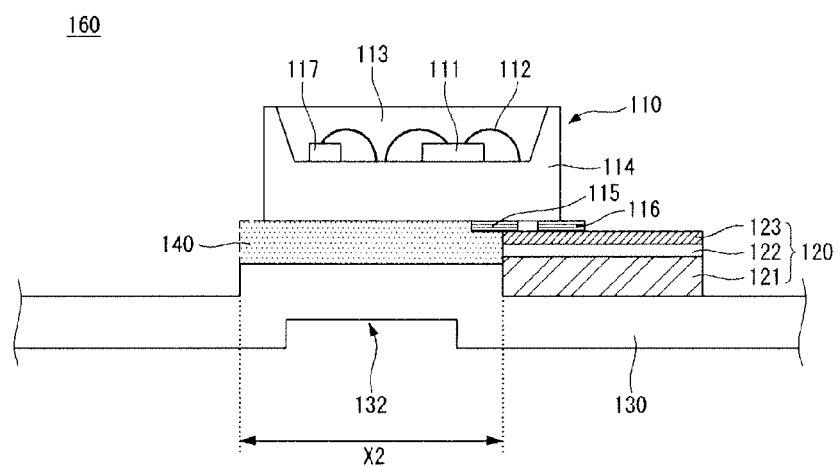
FIGS. 4 and 5 are diagrams illustrating a heat emission structure of a backlight unit according to a second embodiment of this document.
Figure 5:
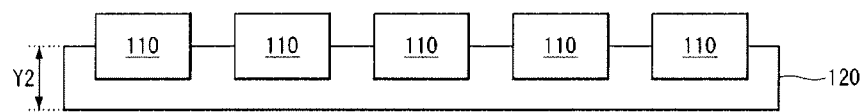

FIGS. 4 and 5 show a heat emission structure of a backlight unit according to a second embodiment of this document;

Referring to FIGS. 4 and 5, a backlight unit 160 according to the second embodiment comprises an LED package 110, a light source PCB 120, and a bottom cover 130.

The LED package 110 is different from the LED package 10 in FIG. 2 which is mounted on the middle of the light source PCB 20 as shown in FIG. 3, in that only a part of the LED package 110 is mounted on one side of the light source PCB 120 as shown in FIG. 5. The remaining part of the LED package 110 which is not mounted on the light source PCB 120 is supported by a heat emission material 140, which is formed on an embossing portion 132 of the bottom cover 130 by a soldering or the like. The structure and function of the LED package 110 are substantially the same as those of the LED package 10 in FIG. 2.

The light source PCB 120 is different from the light source PCB 20 in FIGS. 2 and 3 in having a smaller width than the light source PCB 20. In other words, since a part of the bottom of the LED package 110 is mounted on the light source PCB 120, the width Y2 of the light source PCB 120 in FIG. 5 is reduced by half or more compared with the width Y1 of the light source PCB 20 in FIG. 3. The size of the light source PCB 120 reduced in this way can save the manufacturing cost. The structure and function of the light source PCB 120 are substantially the same as those of the light source PCB 20.

The bottom cover 130 is different from the bottom cover 30 in FIG. 2 in a large design margin at the time of forming the embossing portion 132. The size X2 of the embossing portion 132 is greater than that X1 of the embossing portion 32 in FIG. 2. The embossing portion 132 can be freely enlarged to a larger size, compared with the embossing portion 32 in FIG. 2 which is dependent on the hole size. The protruding height of the embossing portion 132 can vary depending on the thickness of the light source PCB 120 in the same manner as the embossing portion 32 in FIG. 2.

The heat emission material 140 directly transfers heats to the bottom cover 130 via no resin layer and heat emission pad. Thereby, the heat transfer path is made simple and the heat transfer efficiency is much increased.

Figure 6:
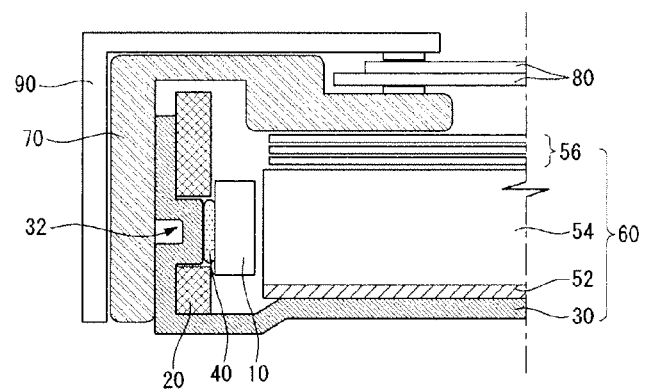
FIG. 6 is a sectional view of a liquid crystal display including the backlight unit according to the first embodiment of this document.

FIG. 6 shows an LCD including the backlight unit according to the first embodiment of this document.

Referring to FIG. 6, the LCD comprises an LC display panel 80, an edge type backlight unit 60 which provides light to the LC display panel 80, and guide and case members which integrally support the LC display panel 80 and the backlight unit 60.

The LC display panel 80 has an LC layer interposed between two glass substrates. A plurality of data lines and a plurality of gate lines are disposed to intersect each other on a lower glass substrate of the LC display panel 80. LC cells are arranged in a matrix at the intersections of the data lines and the gate lines on the LC display panel 80. The lower glass substrate of the LC display panel 80 is provided with the data lines, the gate lines, TFTs (thin film transistors), pixel electrodes of the LC cells connected to the TFTs, and storage capacitors. An upper glass substrate of the LC display panel 80 is provided with black matrices and color filters. Common electrodes are disposed on the upper glass substrate in a vertical electric field driving type such as a TN (twisted nematic) mode and a VA (vertical alignment) mode, and are disposed on the lower glass substrate along with the pixel electrodes in a horizontal electric field type such as an IPS (in plane switching) mode and an FFS (fringe field switching) mode. Polarizers are respectively attached to the outer surfaces of the lower and upper glass substrate of the LC display panel 80. In addition, alignment layers are formed on the inner surfaces having contact to the LC layer to set pretilt angles of the LC layer.

The backlight unit 60 further comprises, in addition to the configuration in FIG. 2, a light guide plate 54 of which a lateral side faces the LED package 10, a reflection film 52 disposed between the light guide plate 54 and the bottom cover 30, and a number of optical sheets 56 disposed between the light guide plate 54 and the LC display panel 80.

The light guide plate 54 converts light emitted from the LED package 10 into a surface light source to be guided to the LC display panel 80. The upper surface, the lower surface, or both of them of the light guide plate 54 are formed with minute intagliated patterns (or embossed patterns) which make the traveling path of light toward the LC display panel 80. The minute intagliated/embossed patterns are densely arranged as farther from the LED package 10, thereby compensating for the low luminance to make the luminance on the surface uniform.

The reflection film 52 is attached on the back of the light guide plate 54. The reflection film 52 functions to reduce the light loss by reflecting light beams toward the LC display panel 80, which travel toward the back of the light guide plate 54.

The optical sheets 56 comprise one or more prism sheets and one or more diffusion sheets, diffuse light beams from the light guide plate 54, and refract the traveling path of light beams at an angle substantially perpendicular to a light incident plane of the LC display panel 80. The optical sheets 56 may include a DBEF (dual brightness enhancement film).

The guide and case members comprise a panel guide 70 and a top case 90.

The panel guide 70 is fabricated as a tetragonal frame which is made of synthetic resin such as polycarbonate, containing glass fibers, and surrounds the LC display panel 80 and the edge type backlight unit. A protruding stepped portion is disposed at the inner wall of the panel guide 70, the LC display panel 80 is arranged on the stepped portion, and the light guide plate 54 and the optical sheets 56 are arranged under the stepped portion.

The top case 90 is fabricated as a tetragonal frame which is made of metals, and surrounds the upper edge (or bezel area) of the LC display panel 80 and the edge of the panel guide 70. The side wall of the top case 90, the side wall of the panel guide 70, and the side wall of the bottom cover 30 overlap each other, and can be coupled to each other by screws passing through these 90, 70 and 30 at the overlap portion.

Figure 7:
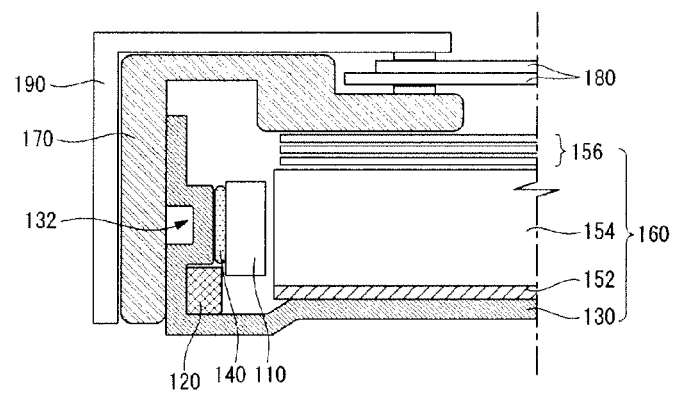
FIG. 7 is a sectional view of a liquid crystal display including the backlight unit according to the second embodiment of this document.

FIG. 7 shows an LCD including the backlight unit according to the second embodiment of this document.

Referring to FIG. 7, the LCD comprises an LC display panel 180, an edge type backlight unit 160 which provides light to the LC display panel 180, and guide and case members which integrally support the LC display panel 180 and the backlight unit 160.

The LC display panel 180 is substantially the same as the LC display panel 80 in FIG. 6, and the guide and case members are substantially the same as those in FIG. 6. The backlight unit 160 is substantially the same as the backlight unit 60 in FIG. 6 except for the differences which have been described with reference to FIGS. 4 and 5.

As described above, the backlight unit and the LCD using the same according to the embodiments of this document can make simple the heat transfer path between the LED package and the bottom cover to improve the heat emission characteristic of the LED package.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A backlight unit comprising:
   a light emitting diode (LED) package including one or more LED chips;
   a light source PCB mounting one side of a bottom of the LED package or both sides of the bottom of the LED package;
   a bottom cover supporting the light source PCB under the light source PCB, wherein the bottom cover includes an embossing portion which protrudes toward the LED package, wherein an entire width of the embossing portion is overlapped with a portion of the bottom of the LED package which is not mounted on the light source PCB; and
   a heat emission material filling between the bottom of the LED package and the embossing portion, wherein the embossing portion is made of metals, a heat emitted from the LED package is transferred to the embossing portion of the bottom cover via the heat emission material, and a distance between the LED package and the embossing portion is shorter than a distance between the LED package and the bottom cover except the embossing portion.

2. The backlight unit of claim 1, wherein a thickness of the embossing portion is proportional to a thickness of the light source PCB.

3. The backlight unit of claim 1, wherein when both sides of the bottom of the LED package are mounted on the light source PCB, a hole is formed in the light source PCB so as to be filled with the heat emission material.

4. The backlight unit of claim 1, wherein when one side of the bottom of the LED package is mounted on the light source PCB, the other side of the LED package which is not mounted is supported by the heat emission material.

5. The backlight unit of claim 1, wherein the heat emission material is filled by a soldering or a pasting.

6. The backlight unit of claim 1, wherein the LED package further comprises a zener diode connected to the LED chip.

7. A liquid crystal display comprising:
a liquid crystal display panel; and
a backlight unit supplying light for the liquid crystal display panel,
wherein the backlight unit includes:
a light emitting diode (LED) package including one or more LED chips;
a light source PCB mounting one side of a bottom of the LED package or both sides of the bottom of the LED package;
a bottom cover supporting the light source PCB under the light source PCB, wherein the bottom cover includes an embossing portion which protrudes toward the LED package, wherein an entire width of the embossing portion is overlapped with a portion of the bottom of the LED package which is not mounted on the light source PCB; and
a heat emission material filling between the bottom of the LED package and the embossing portion, wherein the embossing portion is made of metals, a heat emitted from the LED package is transferred to the embossing portion of the bottom cover via the heat emission material, and a distance between the LED package and the embossing portion is shorter than a distance between the LED package and the bottom cover except the embossing portion.

8. The liquid crystal display of claim 7, wherein a thickness of the embossing portion is proportional to a thickness of the light source PCB.

9. The liquid crystal display of claim 7, wherein when both sides of the bottom of the LED package are mounted on the light source PCB, a hole is formed in the light source PCB so as to be filled with the heat emission material.

10. The liquid crystal display of claim 7, wherein when one side of the bottom of the LED package is mounted on the light source PCB, the other side of the LED package which is not mounted is supported by the heat emission material.

* * * * *